United States Patent
Ananthiah

(10) Patent No.: US 7,339,952 B1
(45) Date of Patent: Mar. 4, 2008

(54) POINTER PROCESSING FOR OPTICAL COMMUNICATION SYSTEMS

(75) Inventor: Umesh Ananthiah, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 1056 days.

(21) Appl. No.: 10/387,243

(22) Filed: Mar. 12, 2003

(51) Int. Cl.
*H04J 3/24* (2006.01)

(52) U.S. Cl. .................. 370/474; 370/389; 370/535

(58) Field of Classification Search ............... 370/352, 370/353, 355, 357, 389, 391, 392, 465, 469–471, 370/473, 474, 537–540
See application file for complete search history.

(56) References Cited

U.S. PATENT DOCUMENTS

| | | | | |
|---|---|---|---|---|
| 5,535,219 | A * | 7/1996 | Freitas ..................... | 370/509 |
| 5,717,693 | A * | 2/1998 | Baydar et al. ............. | 370/514 |
| 7,031,341 | B2 * | 4/2006 | Yu ............................ | 370/469 |
| 2003/0031204 | A1 * | 2/2003 | Ho et al. ................... | 370/471 |
| 2003/0227906 | A1 * | 12/2003 | Hallman .................... | 370/352 |
| 2006/0031555 | A1 * | 2/2006 | Sikdar et al. ............. | 709/231 |

FOREIGN PATENT DOCUMENTS

| EP | 751641 A2 * | 1/1997 |
|---|---|---|
| EP | 1119127 A2 * | 7/2001 |

OTHER PUBLICATIONS

Seetharam, S.W. et al., "A Single Chip Implementation of Receive Path Termination for SONET OC-12c and Quadruple SONET OC-3c," IEEE Symposium on Circuits and Systems, ISCAS '94, May 30, 1994. vol. 3, pp. 237-240.*

* cited by examiner

*Primary Examiner*—Chi Pham
*Assistant Examiner*—Donald L Mills

(57) ABSTRACT

A pointer processing method, in which a pointer value is converted into the corresponding row and column numbers identifying the position of a synchronous payload envelope (SPE) within a data frame. In certain embodiments of the invention, the row number is obtained from the pointer value using a single comparison operation. This is accomplished by using a truncated pointer value to identify the location of the first byte of the SPE envelope to within at most two adjacent rows. The actual row number can then be determined by comparing the full pointer value with a boundary value corresponding to the two identified rows.

17 Claims, 4 Drawing Sheets

US 7,339,952 B1

POINTER PROCESSING FOR OPTICAL COMMUNICATION SYSTEMS

TECHNICAL FIELD

The present invention relates to optical communication networks, and, more specifically, to data transmission over such networks.

BACKGROUND

SONET (Synchronous Optical NETwork) is a North American transmission standard for optical communication systems. SDH (Synchronous Digital Hierarchy), a European transmission standard, is a minor variant of SONET.

SONET defines a hierarchy of electrical signals referred to as Synchronous Transport Signals (STS). The STS hierarchy is built upon a basic signal termed STS-1 having a data rate of 51.84 Mbps. Other signals of the STS hierarchy, termed STS-N, employ data rates that are N times higher than the basic-signal data rate, where N=3, 12, 48, and 192. Each STS-N signal can be generated by multiplexing lower-rate signals. For example, an STS-48 signal having a data rate of 2488.32 Mbps can be generated by multiplexing 48 STS-1, 16 STS-3, or 4 STS-12 signals. The corresponding hierarchy of electrical signals for SDH is referred to as STM-N (Synchronous Transfer Modules-N), where N=1, 4, 16, and 64. STM-1 has a data rate of 155.52 Mbps, which is equivalent to that of STS-3. Optical equivalents of STS and STM signals are referred to as optical carrier (OC) signals.

FIG. 1 shows schematically the format of an STS-1 data frame. An STS-1 frame is a sequence of 810 bytes organized into a matrix having 9 rows and 90 columns numbered 0 to 8 and 0 to 89, respectively. The order of transmission is row by row from top to bottom, left to right. Each STS-1 frame has a Transport Overhead (TOH) portion and a Synchronous Payload Envelope (SPE) portion. The TOH portion includes the bytes in the first three columns, i.e., columns 0, 1, and 2, and is used for framing, error detection, and various Operations, Administration, Maintenance, and Provisioning (OAM&P) functions. The SPE portion includes the bytes in the next 87 columns, i.e., columns 3 through 89, and is used for transmission of SPE envelope data. Each SPE envelope is 783 (=87×9) bytes long and includes 9 Path Overhead (POH) bytes and 774 payload bytes. An SPE envelope can start at any byte location within the SPE portion, which location is identified by pointer bytes in the TOH portion.

FIG. 2 shows schematically two adjacent STS-1 data frames 200 and 204, in which a representative SPE envelope 210 spans across a frame boundary 202. Pointer bytes H1 and H2 in the TOH portion of frame 200 indicate the location of the first byte (J1) of SPE envelope 210. The 9 POH bytes of SPE envelope 210 form a POH column 212 and the remaining bytes of SPE envelope 210 are payload bytes.

FIG. 3 shows schematically the format of pointer bytes H1 and H2. The first six bits of byte H1 are typically empty. A pointer value identifying the location of byte J1 (FIG. 2) is represented by bits P9 through P0, where bits P9 and P0 are the most significant bit (MSB) and the least significant bit (LSB), respectively, of that value. The pointer value can range from 0 to 782 and pointer processing typically includes conversion of the pointer value into the row and column numbers corresponding to the location of byte J1 within the data frame.

One problem with conventional pointer processing is that conversion of a pointer value into the corresponding row and column numbers may include up to 18 comparison operations, which are onerous to implement, for example, in terms of the required logic circuitry. This problem is exacerbated at the upper levels of the STS hierarchy, where processing of multiple pointer values per data frame is performed.

SUMMARY

The problems in the prior art are addressed in accordance with the principles of the present invention by a pointer processing method for a SONET/SDH communication system, in which a pointer value is converted into the corresponding row and column numbers identifying the position of a synchronous payload envelope (SPE) within a data frame. In certain embodiments of the invention, the row number is obtained from the pointer value using a single comparison operation. This is accomplished by using a truncated pointer value to identify the location of the first byte of the SPE envelope to within at most two adjacent rows. The actual row number can then be determined by comparing the full pointer value with a boundary value corresponding to the two identified rows.

According to one embodiment, the present invention is a pointer processing method for a communication system, wherein a pointer value identifies position of a first byte of a payload envelope within a data frame, the method comprising: selecting a sub-set of bits representing the pointer value; generating, based on the sub-set of bits, an approximate row number indicator value corresponding to the position of the first byte; and determining, based on the approximate row number indicator value, an actual row number corresponding to the position of the first byte.

According to another embodiment, the present invention is an apparatus adapted to process communication signals, wherein the processing implements a pointer processing method, in which a pointer value identifies position of a first byte of a payload envelope within a data frame, the apparatus comprising: a first circuit adapted to generate, based on a sub-set of bits representing the pointer value, an approximate row number indicator value corresponding to the position of the first byte; a second circuit coupled to the first circuit and adapted to generate a boundary value based on the approximate row number indicator value; a third circuit coupled to the second circuit and adapted to compare the pointer value with the boundary value; and a fourth circuit coupled to the first and third circuits and adapted to generate, based on the outputs of the first and third circuits, an actual row number corresponding to the position of the first byte.

According to yet another embodiment, the present invention is an apparatus adapted to process communication signals, wherein the processing implements a pointer processing method, in which a pointer value identifies position of a first byte of a payload envelope within a data frame, the apparatus comprising: means for selecting a sub-set of bits representing the pointer value; means for generating, based on the sub-set of bits, an approximate row number indicator value corresponding to the position of the first byte; and means for determining, based on the approximate row number indicator value, an actual row number corresponding to the position of the first byte.

According to still another embodiment, the present invention is a machine-readable medium, having encoded thereon program code, wherein, when the program code is executed by a machine, the machine implements a pointer processing method, in which a pointer value identifies position of a first byte of a payload envelope within a data frame, the method comprising: selecting a sub-set of bits representing the pointer value; generating, based on the sub-set of bits, an approximate row number indicator value corresponding to the position of the first byte; and determining, based on the approximate row number indicator value, an actual row number corresponding to the position of the first byte.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 4:
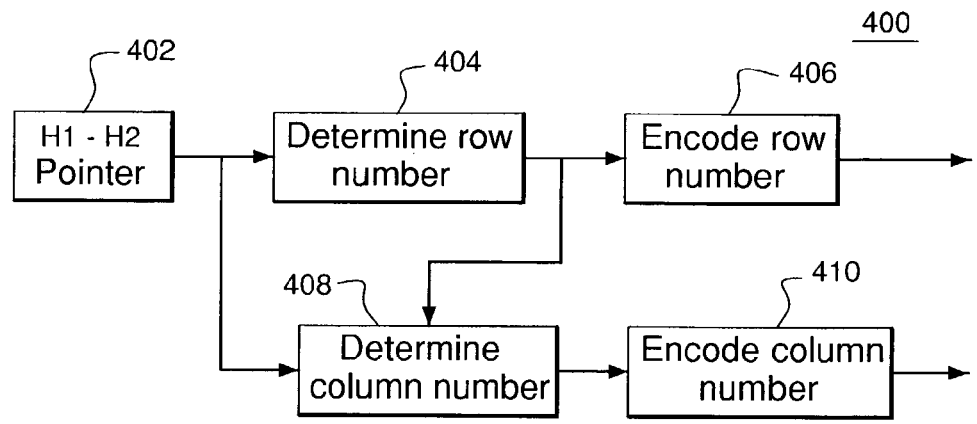
FIG. 4 is a block diagram of a pointer processing method.

FIG. 4 is a flowchart of a pointer processing method 400 for a SONET communication system. Method 400 will be described for STS-1 data frames. As will be apparent to one skilled in the art, method 400 can also be applied to data frames corresponding to other STS hierarchy levels or to STM data frames.

Figure 1:
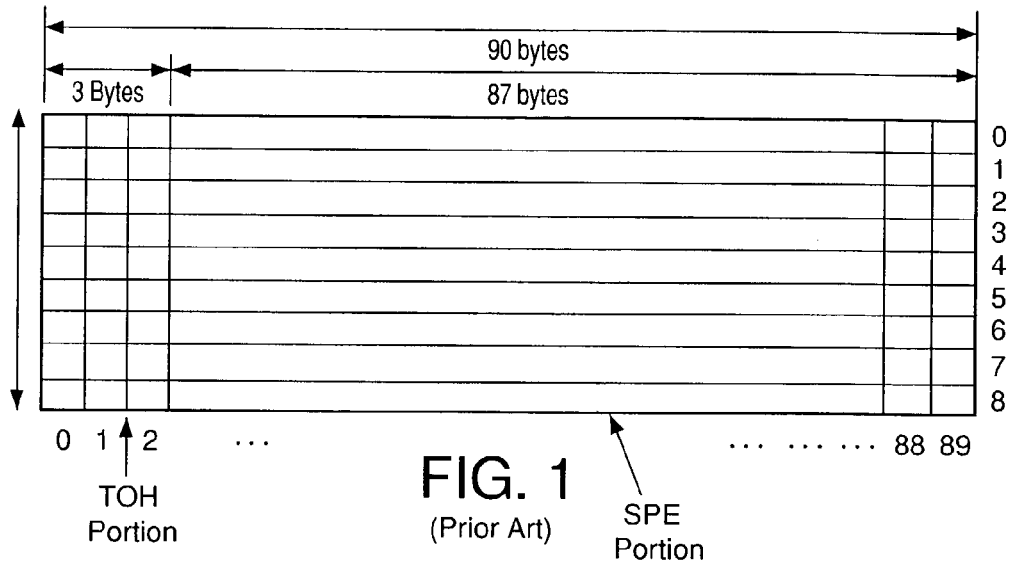
FIG. 1 shows schematically the format of an STS-1 data frame.
Figure 2:
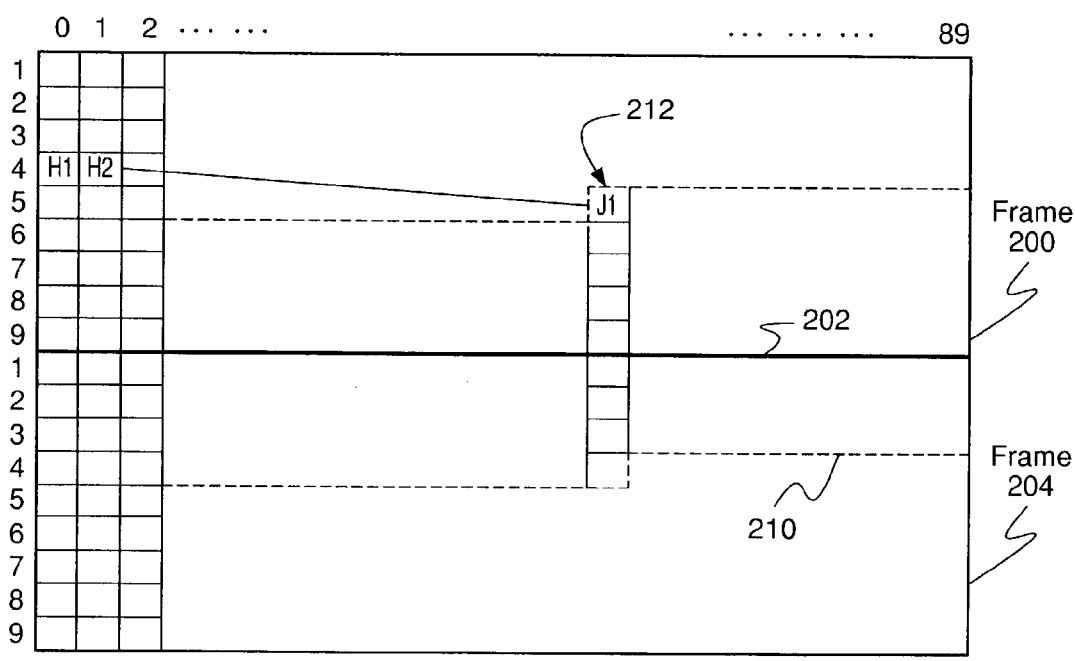
FIG. 2 shows schematically two adjacent STS-1 data frames, in which an SPE envelope spans across the frame boundary.
Figure 3:
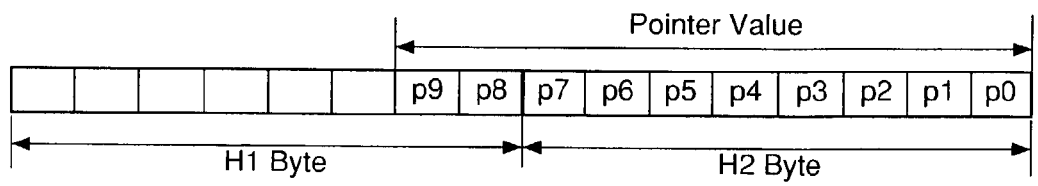
FIG. 3 shows schematically the format of pointer bytes H1 and H2 in an STS-1 frame.

Method 400 begins in process block 402, where pointer value PV is retrieved from pointer bytes H1 and H2 (FIGS. 2 and 3). In process block 404, the pointer value is processed to obtain row number J1R for byte J1 of the SPE envelope. Possible implementations of process block 404 will be described in more detail below. In process block 408, column number J1C for byte J1 is determined using PV and J1R, for example, as follows:

$$J1C = PV - 87 J1R + 3 \qquad (3)$$

In process blocks 406 and 410, the row and column numbers, respectively, are encoded into the corresponding binary values, which are then output for further use in the communication system. More specifically, for an STS-1 data frame, the encoding includes a straight conversion of the J1R and J1C values into their 4- and 7-bit representations, respectively. For an STS-N data frame (N≠1), the encoding performed in process blocks 406 and 410 may also include, prior to binary conversion, offsetting the values of J1R and J1C, as known in the art, to take into account the interleaved structure of the STS-N frame. For example, for an STS-48 data frame, in process blocks 406 and 410, the values of J1R and J1C corresponding to a particular SPE envelope are first appropriately offset and then the offset values are converted into their 10- and 13-bit representations, respectively.

Figure 5:
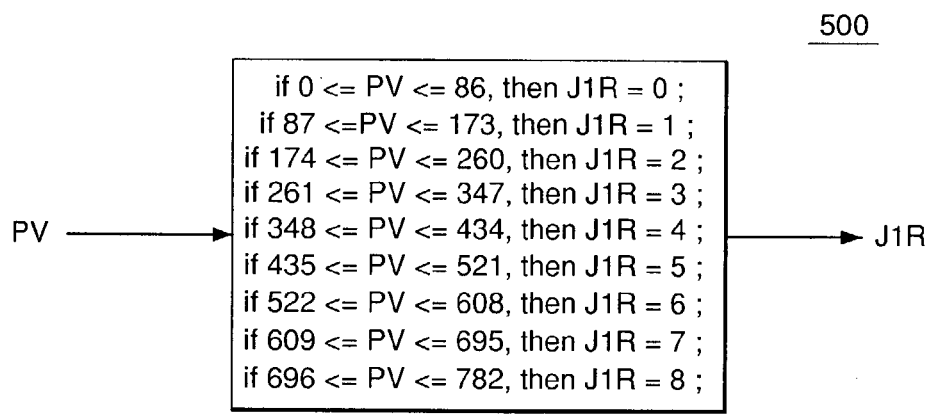
FIG. 5 illustrates a prior art implementation of the row-determination process block in the pointer processing method of FIG. 4.

FIG. 5 illustrates a prior art process block 500 that can be used as process block 404 in method 400. In process block 500, the range of possible pointer values PV, from 0 to 782, is divided into nine intervals, each interval corresponding to a different row of the SPE portion of an STS data frame. The pointer value is then compared with the lower and upper bounds of each interval to determine the particular interval to which the pointer value belongs. The value of J1R is then assigned to be equal to the row number corresponding to that particular interval.

Figure 6:
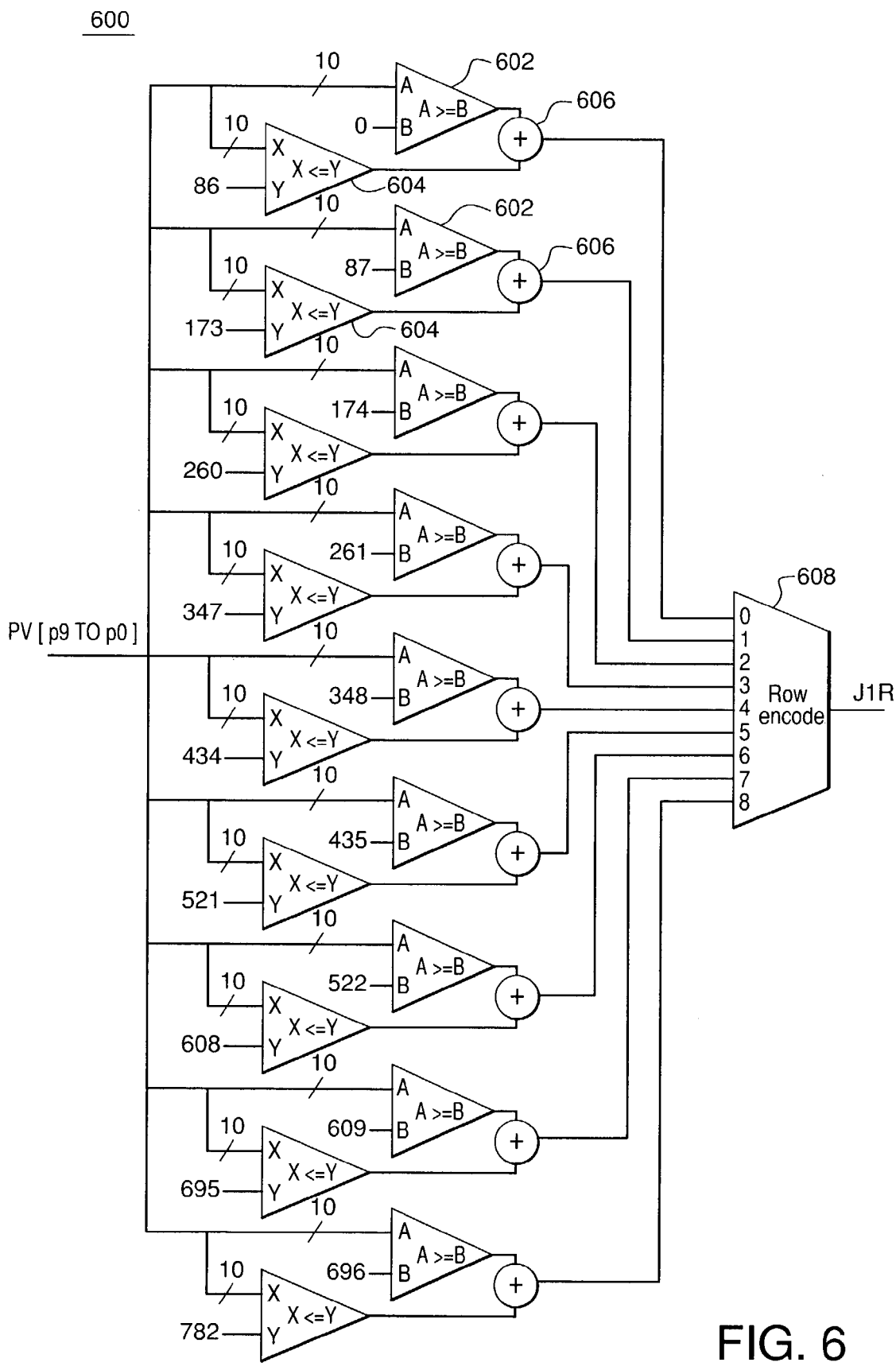
FIG. 6 shows a block diagram of a circuit typically used to implement the processing of the process block shown in FIG. 5.

FIG. 6 shows a block diagram of a circuit 600 typically used to implement the processing of process block 500. Circuit 600 includes 9 pairs of comparators, each pair comprising an (A>=B) comparator 602 and an (X<=Y) comparator 604. Comparator 602 compares the values applied to the A and B inputs of that comparator and generates a 1-bit output based on the result of the comparison. For example, if the inequality A≧B is true, comparator 602 outputs a "0" and, if said inequality is false, the comparator outputs a "1". Similarly, comparator 604 compares the values applied to the X and Y inputs of that comparator and generates a 1-bit output, which is a "0", if X≦Y is true, and a "1", if X≦Y is false. A 10-bit PV value is applied to each of the A and X inputs of comparators 602 and 604, while the lower and upper bounds of each interval indicated in FIG. 5 are applied to the B and Y inputs, respectively, of the corresponding pair of comparators 602 and 604. The two outputs of each comparator pair are applied to a 1-bit adder 606, and the output of each adder 606 (a total of 9 outputs) is applied to a row encode element 608. For each comparator pair, the output of the corresponding adder 606 will be zero only if the PV value lies within the bounds corresponding to that comparator pair. Therefore, of the 9 input ports (numbered from 0 to 8) of row encode element 608, only one input port will have a "0", while each of the remaining 8 input ports will have a "1". The input port number to which the zero is applied is output by the row encode element 608 as the value of J1R.

As indicated in FIG. 6, circuit 600 implementing process block 500 employs 18 comparators. It is known in the art that, in an integrated circuit (IC), a comparator takes up a relatively large surface area. Consequently, a large number of comparators per IC may significantly increase the required IC area and the cost. It is therefore desirable to reduce the number of comparison operations in process block 404 of method 400 compared to that of prior art process block 500.

Figure 7:
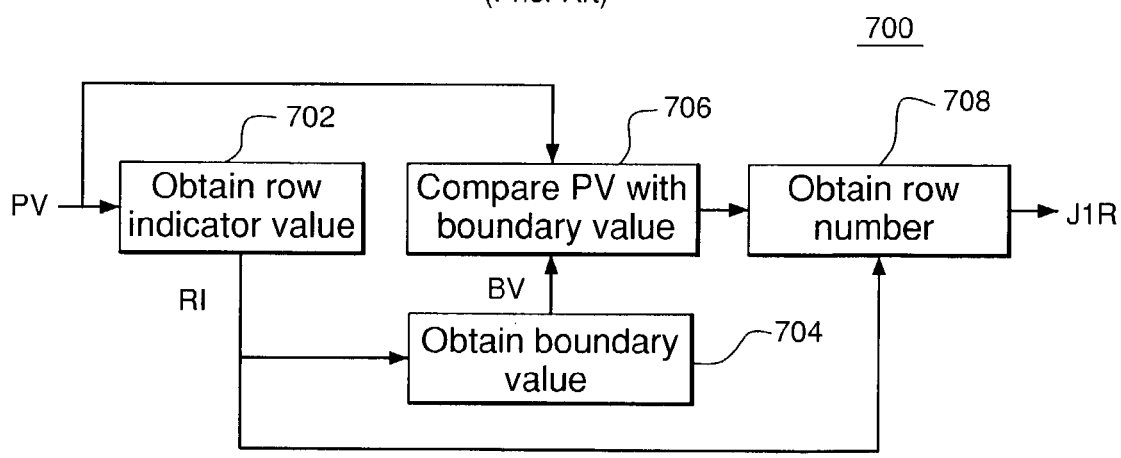
FIG. 7 is a block diagram of the row-determination process block in the pointer processing method of FIG. 4 according to one embodiment of the present invention.

FIG. 7 is a flowchart of a method 700 that can be used to implement process block 404 in method 400 according to one embodiment of the present invention. In method 700, the row number J1R is obtained from the pointer value PV using a single comparison operation. This is accomplished by first identifying the location of byte J1 to within at most two adjacent rows and then determining the actual row number based on a boundary value corresponding to the two identified rows.

Method 700 begins in process block 702, where PV is processed to identify the location of byte J1 to within two adjacent rows or better. More specifically, in process block 702, the four MSBs of the pointer value (i.e., bits p9-p6 in FIG. 3) are retrieved from bytes H1 and H2 as a 4-bit value FB. Since PV ranges from 0 (i.e., 10-bit binary 0000000000) to 782 (i.e., 10-bit binary 1100001110), FB (i.e., the binary value of the 4 MSBs of PV) ranges from 0 (i.e., 4-bit binary 0000) to 12 (i.e., 4-bit binary 1100). According to method 700, the 4-bit FB values map to 4-bit row indicator (RI) values, which run from 0 to 8. This mapping is shown in Table I. Each row indicator value corresponds to approximate row number for a range of PV values, where the approximate row number is at most one row away from the actual row number for each PV value. Table I also shows the mapping of row indicator values RI to actual row numbers J1R. As indicated in Table I, each of value of row indicator RI from 0 to 7 maps to two different values of row number J1R, while a row indicator value RI of 8 maps to row number J1R=8.

TABLE I

Correspondence between the 4 MSBs of the Pointer Value, the Row Indicator Value, and the Row Number

| 4 MSBs (FB) of the Pointer Value (PV) | Row Indicator (RI) | Row Number (J1R) |
|---|---|---|
| 0-1 | 0 | 0 or 1 |
| 2-3 | 1 | 1 or 2 |
| 4 | 2 | 2 or 3 |
| 5 | 3 | 3 or 4 |
| 6-7 | 4 | 4 or 5 |
| 8 | 5 | 5 or 6 |
| 9 | 6 | 6 or 7 |
| 10 | 7 | 7 or 8 |
| 11-12 | 8 | 8 |

After RI is determined in process block 702, the processing proceeds to process blocks 704 and 706. In process block 704, using RI, a boundary value BV is determined based on the mapping in Table II. The boundary value BV is used to determine the actual row number J1R from the approximate row number RI. In particular, in process block 706, the pointer value PV is compared with the boundary value BV determined in process block 704. In one implementation, the result of the comparison indicates whether the inequality (PV<BV) is true or false. After process block 706, the processing proceeds to process block 708.

TABLE II

Boundary Values

| Row Indicator (RI) | Boundary Value (BV) |
|---|---|
| 0 | 87 |
| 1 | 174 |
| 2 | 261 |
| 3 | 348 |
| 4 | 435 |
| 5 | 522 |
| 6 | 609 |
| 7 | 696 |
| 8 | 783 |

In process block 708, the actual row number J1R is selected from the one or two possible row numbers indicated in the last column of Table I for the corresponding RI value. In particular, if (PV<BV) is true, then the lower value given in the last column of Table I is selected to be the value of J1R. Otherwise, if (PV<BV) is false, then the higher value is selected. Note that, for RI=8, J1R is always 8.

The following provides representative examples of pointer processing in process block 700.

When PV=600 (binary 1001011000),
 in process block 702, FB is determined to be 9 (binary 1001) and RI is determined to be 6 (Table I);
 in process block 704, BV is determined to be 609 (Table II);
 in process block 706, (PV<BV) is determined to be true (600<609); and
 in process block 708, J1R is determined to be 6 (the lower value of 6 and 7 in Table I).

When PV=620 (binary 1001101100),
 in process block 702, FB is determined to be 9 (binary 1001) and RI is determined to be 6 (Table I);
 in process block 704, BV is determined to be 609 (Table II);
 in process block 706, (PV<BV) is determined to be false (620>609); and
 in process block 708, J1R is determined to be 7 (the higher value of 6 and 7 in Table I).

Figure 8:
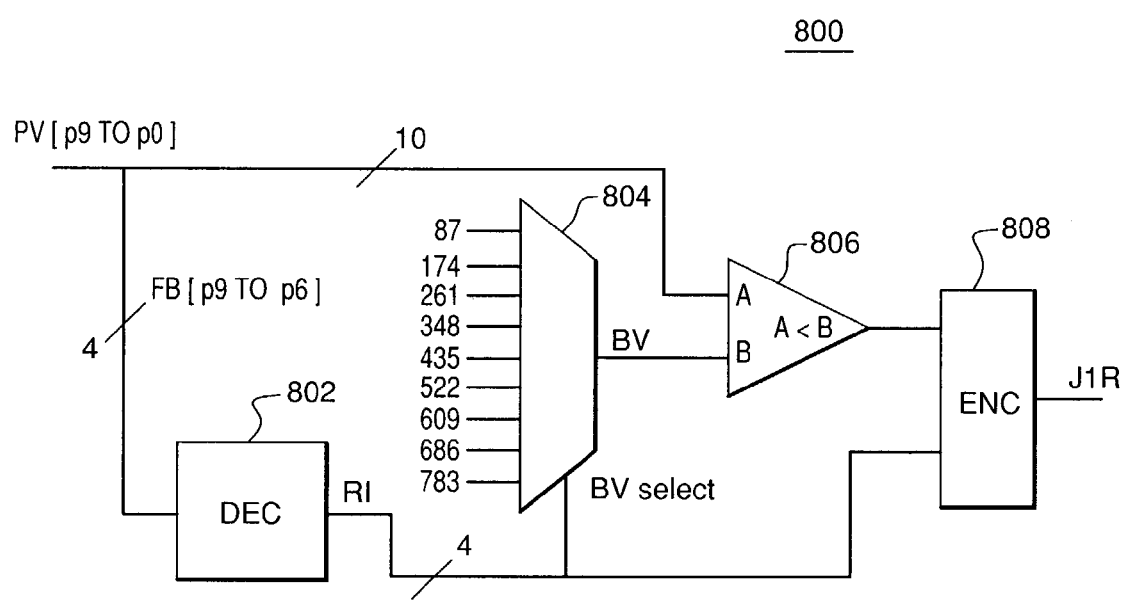
FIG. 8 shows a block diagram of a circuit that can be used to implement the processing of the process block shown in FIG. 7 according to one embodiment of the present invention.

FIG. 8 shows a circuit 800 that can be used to implement the processing of method 700 according to one embodiment of the present invention. Circuit 800 comprises a decoder 802, a look-up table (LUT) 804, a comparator 806, and an encoder 808. Decoder 802 generates RI values by decoding FB (i.e., bits p9-p6 of the pointer value PV). LUT 804 stores possible boundary values BV and outputs an appropriate BV value using the RI value from decoder 802 as an address. Comparator 806 compares the PV value and the BV value from LUT 804 applied to the A and B inputs, respectively, and generates a 1-bit output based on the result of the comparison. For example, if the inequality (A<B) is true, then comparator 806 outputs a "0" and, if said inequality is false, then the comparator outputs a "1". Encoder 808 is coupled to the outputs of decoder 802 and comparator 806 and is configured to generate J1R, for example, as described above for process block 708 (FIG. 7). In various embodiments, decoder 802 and encoder 808 can be implemented as look-up tables or other suitable logic circuits. Since implementation of circuit 800 will typically require significantly less surface area than the 18 comparators of circuit 600, the cost of circuitry implementing the processing of method 400 (FIG. 4) can be significantly reduced by using circuit 800 instead of circuit 600.

While this invention has been described with reference to illustrative embodiments, this description is not intended to be construed in a limiting sense. Although the present invention was described in reference to STS-1 data frames, it may also be used for any STS-N, OC-N, or S™-N frames, and/or appropriate data formats conforming to standards other than SONET or SDH. In general, a pointer value may be processed using a different number or combination (e.g., sub-set) of bits of pointer bytes H1 and H2. Depending on the processed bits, a different appropriate number of comparison operations may need to be performed. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation on a single integrated circuit. For example, the present invention may be implemented in an ASIC, a programmable logic device (PLD), a field-programmable gate array (FPGA), or other suitable circuits. As would be apparent to one skilled in the art, various functions of circuit elements may also be implemented as part of a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the acts in the following method claims, if any, are recited in a particular sequence with corresponding labeling, unless the claim recitations otherwise imply a particular sequence for implementing some or all of those acts, those acts are not necessarily intended to be limited to being implemented in that particular sequence.

What is claimed is:

1. A pointer processing method for a communication system, wherein a pointer value identifies position of a first byte of a payload envelope within a data frame, the method comprising:
   selecting a sub-set of bits representing the pointer value;
   generating, based on the sub-set of bits, a row number indicator value corresponding to the position of the first byte;
   determining, based on the row number indicator value, an actual row number corresponding to the position of the first byte, wherein determining the actual row number comprises:
      determining a boundary value corresponding to the row number indicator value;
      comparing the pointer value with the boundary value; and
      determining the actual row number based on the result of the comparison; and
   from the actual row number, determining the row and column position of the first byte of the payload envelope within the data frame.

2. The method of claim 1, wherein selecting the sub-set of bits comprises selecting a specified number of most significant bits (MSBs) of the pointer value.

3. The method of claim 1, wherein the row number indicator value is at most one row away from the actual row number.

4. The method of claim 1, wherein the determining the actual row number is implemented using a single comparison operation.

5. The method of claim 1, wherein:
   the communication system conforms to a SONET standard;
   the payload envelope is a synchronous payload envelope (SPE);
   the data frame is a synchronous transport signals (STS) data frame; and
   the STS data frame includes an STS-N data frame, where N=1, 3, 12, 48, or 192.

6. The method of claim 1, further comprising:
   determining an actual column number corresponding to the position of the first byte using the actual row number; and
   encoding the actual row and column numbers.

7. Apparatus adapted to process communication signals, wherein the processing implements a pointer processing method, in which a pointer value identifies position of a first byte of a payload envelope within a data frame, the apparatus comprising:
   a first logic circuit adapted to generate, based on a sub-set of bits representing the pointer value, a row number indicator value corresponding to the position of the first byte;
   a second logic circuit coupled to the first circuit and adapted to generate a boundary value based on the row number indicator value;
   a third logic circuit coupled to the second circuit and adapted to compare the pointer value with the boundary value; and
   a fourth logic circuit coupled to the first and third circuits and adapted to generate, based on the outputs of the first and third circuits, an actual row number corresponding to the position of the first byte.

8. The apparatus of claim 7, wherein the first, second, and fourth circuits are look-up tables (LUTs), and the third circuit is a single comparator.

9. The apparatus of claim 7, wherein the first circuit is a decoder, the second circuit is a multiplexer, the third circuit is a comparator, and the fourth circuit is an encoder.

10. The apparatus of claim 7, wherein the sub-set of bits is a specified number of most significant bits (MSBs) of the pointer value.

11. The apparatus of claim 7, wherein the row number indicator value is at most one row away from the actual row number.

12. The apparatus of claim 7, wherein apparatus has a single comparator.

13. The apparatus of claim 7, further comprising:
   a fifth circuit coupled to the fourth circuit and adapted to determine an actual column number corresponding to the position of the first byte using the actual row number; and
   one or more encoders adapted to encode the actual row and column numbers.

14. The apparatus of claim 7, wherein:
   the apparatus conforms to a SONET standard;
   the payload envelope is a synchronous payload envelope (SPE);
   the data frame is a synchronous transport signals (STS) data frame; and
   the STS data frame includes an STS-N data frame, where N=1, 3, 12, 48, or 192.

15. Apparatus adapted to process communication signals, wherein the processing implements a pointer processing method, in which a pointer value identifies the position of a first byte of a payload envelope within a data frame, the apparatus comprising:
   means for selecting a sub-set of bits representing the pointer value; and means for determining, based at least on the sub-set of bits, an actual row number corresponding to the position of the first byte, wherein determining the actual row number comprises:
- determining a boundary value;
- comparing the pointer value with the boundary value; and
- determining the actual row number based on the result of the comparison.

16. A machine-readable storage medium, having encoded thereon program code, wherein, when the program code is executed within a programmable logic device (PLD), the PLD implements a pointer processing method, in which a pointer value identifies the position of a first byte of a payload envelope within a data frame, the method comprising:

- selecting a sub-set of bits representing the pointer value; and
- determining, based at least on the sub-set of bits, an actual row number corresponding to the position of the first byte, wherein determining the actual row number comprises:
  - determining a boundary value;
  - comparing the pointer value with the boundary value; and
  - determining the actual row number based on the result of the comparison.

17. The machine-readable storage medium of claim 16, wherein the boundary value corresponds to a row number indicator value.

* * * * *